United States Patent
Chang et al.

(10) Patent No.: US 10,936,029 B2
(45) Date of Patent: Mar. 2, 2021

(54) METHOD FOR COOLING A HEAT SOURCE BY LIQUEFIED GAS

(71) Applicant: Acer Incorporated, New Taipei (TW)

(72) Inventors: Yi-Mu Chang, New Taipei (TW); Ching-Piao Kuan, New Taipei (TW); Fu-Sheng Teng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 103 days.

(21) Appl. No.: 16/151,377

(22) Filed: Oct. 4, 2018

(65) Prior Publication Data
US 2019/0278344 A1     Sep. 12, 2019

(30) Foreign Application Priority Data
Mar. 6, 2018   (TW) .............................. 107107442 A

(51) Int. Cl.
*G06F 1/20*     (2006.01)
*F25B 19/00*    (2006.01)
*F25B 41/04*    (2006.01)

(52) U.S. Cl.
CPC ............ *G06F 1/203* (2013.01); *F25B 19/005* (2013.01); *F25B 41/04* (2013.01); *F17C 2205/0382* (2013.01)

(58) Field of Classification Search
CPC ......................... F25B 19/005; H05K 7/20218; H05K 7/2029; H05K 7/208
See application file for complete search history.

(56) References Cited

U.S. PATENT DOCUMENTS

| 2007/0062674 | A1* | 3/2007 | Ippoushi ............... H01L 23/473 165/80.4 |
| 2008/0022845 | A1 | 1/2008 | Chung et al. |
| 2012/0265235 | A1* | 10/2012 | Hackett ............... A61M 25/005 606/192 |
| 2013/0025827 | A1 | 1/2013 | Su et al. |
| 2019/0166717 | A1* | 5/2019 | Gass .................. H05K 7/20136 |

FOREIGN PATENT DOCUMENTS

| TW | 200822845 A | 5/2008 |
| TW | 201306454 A | 2/2013 |

OTHER PUBLICATIONS

Chinese language office action dated Nov. 26, 2018, issued in application No. TW 107107442.

* cited by examiner

*Primary Examiner* — Marc E Norman
(74) *Attorney, Agent, or Firm* — McClure, Qualey & Rodack, LLP

(57) ABSTRACT

A method for cooling a heat source by liquefied gas is provided, wherein the heat source is cooled by filling a liquefied gas into a chamber close to the heat source, and the heat source is located in an electronic device. The temperature of the heat source is detected, and the liquefied gas is filled into the chamber via an inlet valve to absorb heat generated by the heat source when the temperature of the heat source rises to a first value. Specifically, an exhaust valve that communicates with the chamber is opened when the temperature of the heat source decreases and then rises to a second value or the pressure inside the chamber reaches a critical value, so that the liquefied gas in the chamber can be vaporized and discharged through the exhaust valve to an atmospheric environment.

17 Claims, 3 Drawing Sheets

METHOD FOR COOLING A HEAT SOURCE BY LIQUEFIED GAS

CROSS REFERENCE TO RELATED APPLICATIONS

This application claims priority of Taiwan Patent Application Ser. No. 107107442, filed on Mar. 6, 2018, the entirety of which is incorporated by reference herein.

BACKGROUND OF THE INVENTION

Field of the Invention

The application relates in general to a cooling method, and in particular, to a method for cooling a heat source using liquefied gas.

Description of the Related Art

As technology has advanced, there has been a trend toward developing portable electronic devices of a compact size. However, owing to the reduced dimensions of the electronic devices, heat generated by the electronic components inside the electronic devices can become difficult to dissipate, so that overheating and functional failure of the system may occur.

In conventional laptop computers and other portable electronic devices, a thermal module is usually provided with heat pipes to transfer heat from the heat source to the thermal fins, and heat can subsequently be dissipated by a cooling fan. In some high-end products, such as gaming laptop computers, a special, highly efficient thermal module is required to rapidly cool the electronic components therein.

BRIEF SUMMARY OF INVENTION

In view of the aforementioned problems, the object of the invention is to provide a method for cooling a heat source, wherein the heat source is cooled by filling a liquefied gas into a chamber close to the heat source, and the heat source is located in an electronic device. In some embodiments, the temperature of the heat source is detected, and the liquefied gas is filled into the chamber via an inlet valve to absorb heat generated by the heat source when the temperature of the heat source rises to a first value. Specifically, an exhaust valve that communicates with the chamber is opened when the temperature of the heat source decreases and then rises to a second value or the pressure inside the chamber reaches a critical value, so that the liquefied gas in the chamber can be vaporized and discharged through the exhaust valve to an atmospheric environment.

In some embodiments, when the temperature of the heat source reaches the first value, the liquefied gas is filled into the chamber from a liquefied gas source until the pressure inside the chamber equals the pressure inside the liquefied gas source.

In some embodiments, the liquefied gas source comprises a liquefied gas tank or a replaceable liquefied gas bottle.

In some embodiments, the heat source comprises an electronic element, and the liquefied gas source is disposed outside the electronic device.

In some embodiments, when the temperature of the heat source decreases and then rises to the second value or the pressure inside the chamber reaches the critical value, the exhaust valve is opened until the pressure inside the chamber equals the pressure of the atmospheric environment.

In some embodiments, during vaporization and discharge of the liquefied gas in the chamber through the exhaust valve to the atmospheric environment, the exhaust valve is closed when the pressure inside the chamber decreases from the critical value to below a safety value.

In some embodiments, during vaporization and discharge of the liquefied gas in the chamber through the exhaust valve to the atmospheric environment, the exhaust valve is closed when the temperature of the heat source decreases from the second value to a third value.

In some embodiments, the method further comprises the step of opening a safety valve to reduce the pressure inside the chamber when the pressure inside the chamber is greater than a limit value, wherein the safety valve is connected to the chamber.

In some embodiments, the liquefied gas comprises carbon dioxide ($CO_2$).

In some embodiments, the first and second values are within a range of 50° C. to 70° C.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the method for cooling a heat source by liquefied gas are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
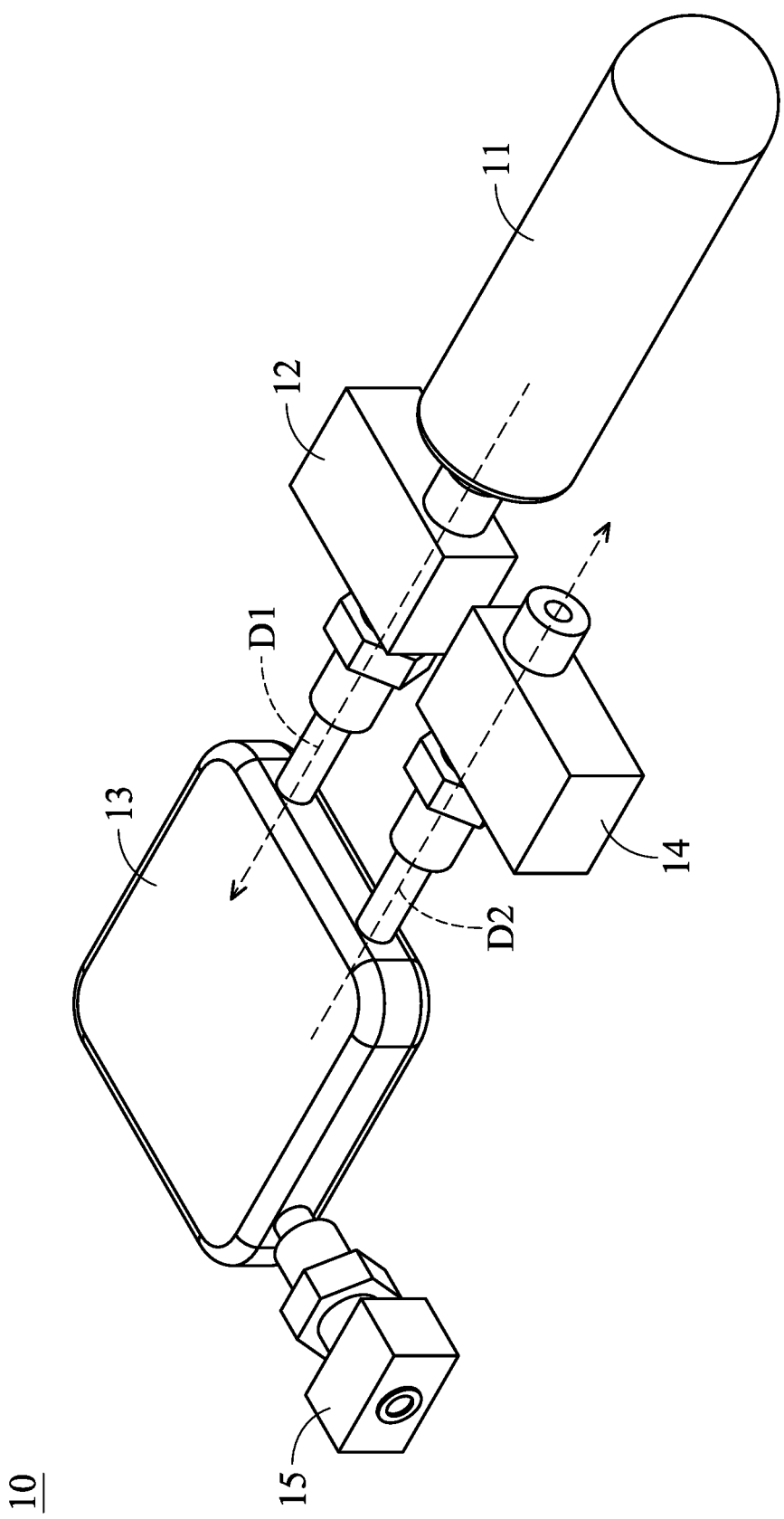
FIG. 1 is a perspective view showing a cooling module 10 according to an embodiment of the invention.

FIG. 1 shows a perspective view of a cooling module 10 according to an embodiment of the invention. Referring to FIG. 1, the cooling module 10 primarily comprises a liquefied gas source 11, an inlet valve 12, a hollow chamber 13, an exhaust valve 14, and a safety valve 15. In this embodiment, the valves of the cooling module 10 can be switched on or off, so that heat generated within an electronic device can be efficiently dissipated, and the temperature of the electronic components in the electronic device can be rapidly reduced. In an exemplary embodiment, the liquefied gas source 11 may comprise a steel bottle with liquefied gas such as carbon dioxide ($CO_2$) accommodated therein. The chamber 13 is located close to a heat source within the electronic device for cooling the heat source.

It should be noted that when the inlet valve 12 is opened to communicate the chamber 13 with the liquefied gas source 11, a part of the liquefied gas in the liquefied gas source 11 close to the inlet valve 12 is vaporized and transferred into gas phase because of the pressure difference between the chamber 13 and the liquefied gas source 11. As a part of the liquefied gas is vaporized, it can be ejected from the liquefied gas source 11 into the chamber 13 via the inlet valve 12 (as the arrow D1 indicates in FIG. 1) until the pressure inside the chamber 13 equals the pressure inside the liquefied gas source 11. When the pressures of the chamber 13 and the liquefied gas source 11 are balanced, the vaporized gas in the chamber 13 is liquefied again and consistent with the liquefied gas source 11.

Similarly, when the exhaust valve 14 is opened, a part of the liquefied gas in the chamber 13 close to the exhaust valve 14 can be vaporized (transferred into gas phase) because of the pressure difference between the chamber 13 and the atmospheric environment. As a part of the liquefied gas in the chamber 13 is vaporized, it can be ejected from the chamber 13 to the atmospheric environment via the exhaust valve 14, as the arrow D2 indicates in FIG. 1. In this embodiment, the inlet valve 12 and the exhaust valve 14 may be electronic control valves which are electrically connected to a circuit control unit (not shown), so that the inlet valve 12 and the exhaust valve 14 can be switched on or off by the circuit control unit.

Figure 2:
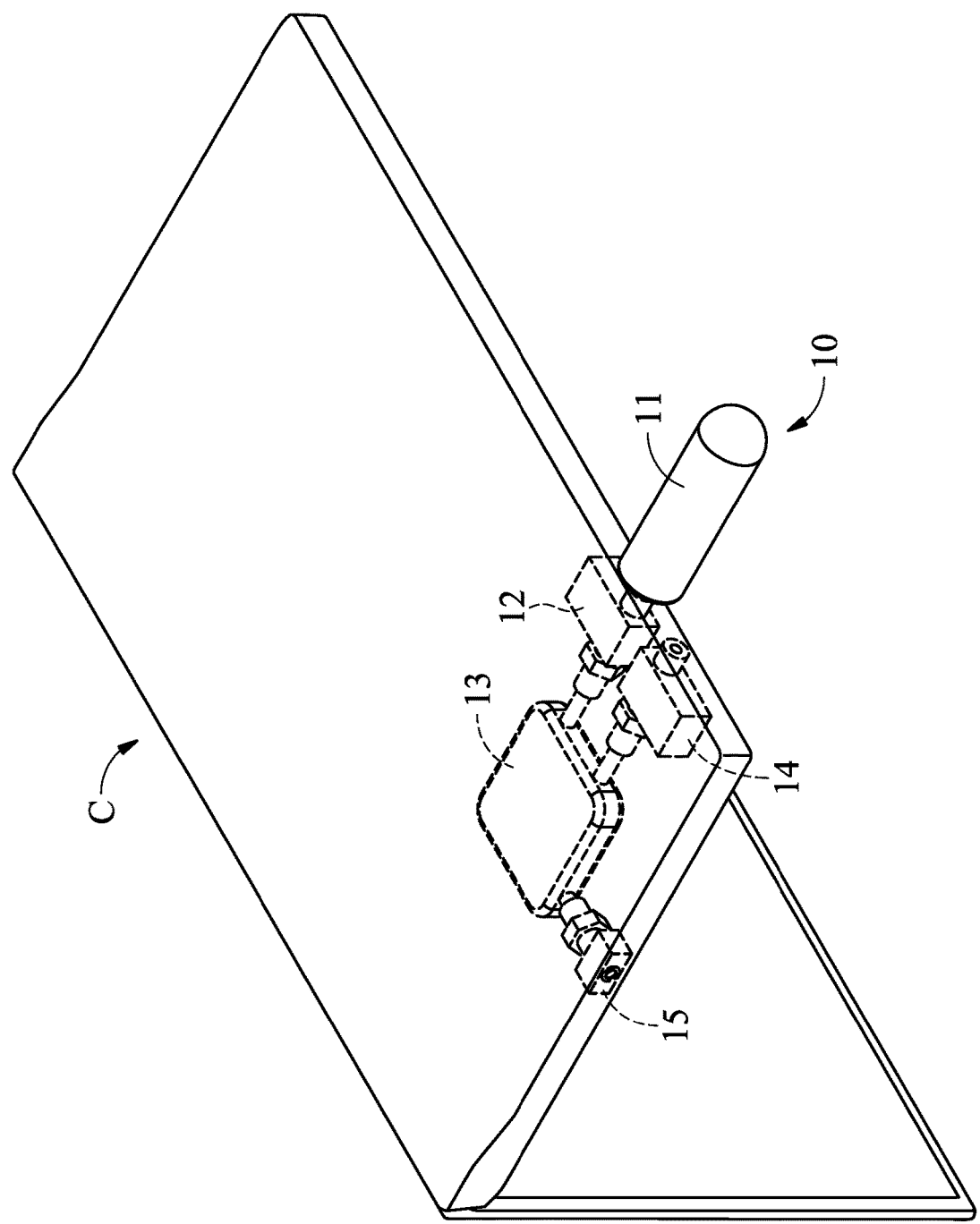
FIG. 2 is a perspective view showing the cooling module 10 of FIG. 1 that is disposed in an electronic device C.

As mentioned above, the liquefied gas in the liquefied gas source 11 can be injected into the chamber 13 via the inlet valve 12 for rapidly cooling the heat source inside the electronic device. FIG. 2 is a perspective view showing the cooling module 10 of FIG. 1 which is disposed in an electronic device C. In this embodiment, the electronic device C may be a laptop computer, and the inlet valve 12, the hollow chamber 13, the exhaust valve 14, and the safety valve 15 of the cooling module 10 are accommodated in the electronic device C. As shown in FIG. 2, the liquefied gas source 11 is located outside the electronic device C and detachably joined with the inlet valve 12. When the liquefied gas source 11 (e.g. liquefied gas bottle) needs to be replaced or refilled, it can be easily detached from the inlet valve 12 from the outside of the electronic device C, thus facilitating convenient use of the cooling module 10.

In some embodiments, the liquefied gas source 11 may have a liquefied gas tank connected to a continuous liquefied gas supply system, so that the liquefied gas can be continuously supplied to the cooling module 10 for a long period without replacement of the liquefied gas source 11.

Still referring to FIGS. 1 and 2, the chamber 13 in this embodiment is disposed inside the electronic device C and close to a heat source (not shown) in the electronic device C, wherein the heat source may be a CPU (Central Processing Unit), GPU (Graphics Processing Unit), or other integrated circuit element. In some embodiments, a temperature sensor may be provided near the heat source to detect the temperature thereof. It should be noted that when the temperature of the heat source rises to a first value T1, the inlet valve 12 is opened to allow the liquefied gas filling into the chamber 13 until the pressure P inside the chamber 13 equals the pressure P0 of the liquefied gas source 11. Once the pressure P inside the chamber 13 and the pressure P0 of the liquefied gas source 11 are balanced, the inlet valve 12 is closed, and the liquefied gas in the chamber 13 can absorb heat generated from the heat source in the electronic device C.

As mentioned above, heat generated by the heat source in the electronic device C can be absorbed by filling the liquefied gas into the chamber 13, and after the temperature of the heat source decreases from the first value T1 for a period, the temperature thereof will rise again to a second value T2 as the heat source continuously generates heat during operation. In this circumstance, the exhaust valve 14 can be opened to communicate the chamber 13 with the atmospheric environment for the subsequent cooling process.

When the exhaust valve 14 is opened, a part of the liquefied gas inside the chamber 13 and close to the exhaust valve 14 is vaporized and transferred into gas phase because of the pressure difference between the chamber 13 and the atmospheric environment, and the vaporized gas can be exhausted from the chamber 13 to the atmospheric environment via the exhaust valve 14. During vaporization of the liquefied gas in the chamber 30, considerable heat energy can be absorbed to further cool the heat source in the electronic device C, thereby achieving efficient and rapid heat dissipation of the cooling module 10.

In this embodiment, a pressure sensor may also be provided in the cooling module 10 for detecting the pressure in the chamber 13. When the liquefied gas continuously absorbs heat energy and causes the pressure P inside the chamber 13 to exceed a critical value P1, the exhaust valve 14 can be opened to vaporize and discharge the liquefied gas in the chamber 13 through the exhaust valve 14 to the atmospheric environment.

In some embodiments, when the pressure sensor detects that the pressure in the chamber 13 rapidly rises and exceeds a limit value, the fluid in the chamber 13 may be immediately exhausted to the atmospheric environment through the safety valve 15 for safety.

Figure 3:
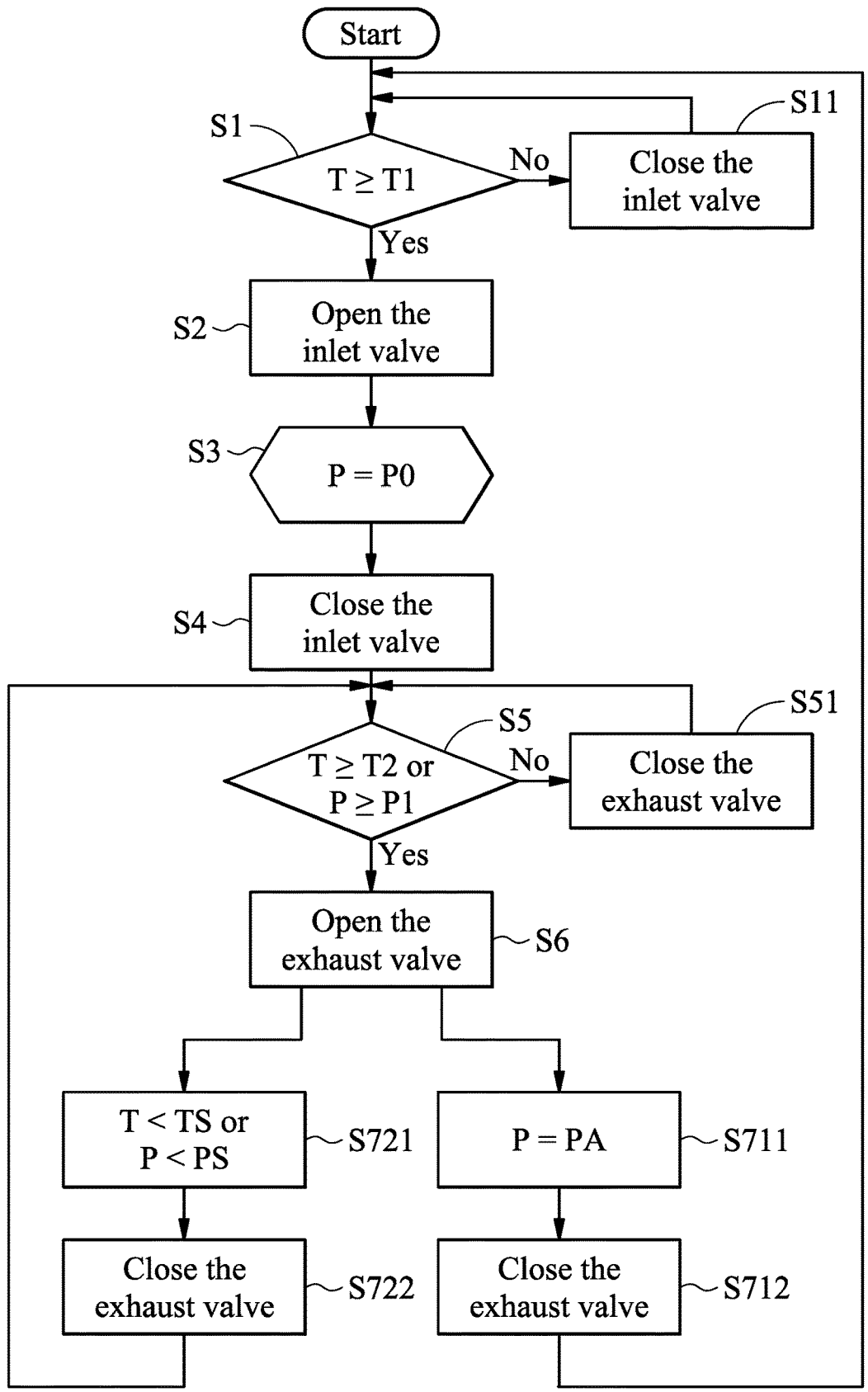
FIG. 3 is a flowchart diagram illustrating a cooling method using liquefied gas, wherein the liquefied gas can be filled into the chamber 13 as shown in FIGS. 1 and 2.

FIG. 3 is a flowchart diagram illustrating a cooling method using liquefied gas, wherein the liquefied gas can be filled into the chamber 13 as shown in FIGS. 1 and 2, and the chamber 13 is close to a heat source in an electronic device C, so that the heat source can be rapidly cooled down by the liquefied gas. Referring to steps S1-S4 in FIG. 3, firstly, the temperature of the heat source can be detected by a temperature sensor close thereto, and when the temperature T of the heat source rises to a first value T1, i.e. T≥T1 (step S1), the inlet valve 12 is opened (step S2) to allow the liquefied gas filling into the chamber 13 until the pressure P inside the chamber 13 equals the pressure P0 inside the liquefied gas source 11, i.e. P=P0 (step S3). Once the pressure P inside the chamber 13 rises and equals the pressure P0 inside the liquefied gas source 11 (step S3), the inlet valve 12 is closed (step S4), and the heat source can be cooled down by the liquefied gas inside the chamber 13 as a first stage of cooling. Otherwise, the inlet valve 12 remains closed (step S11) if the temperature T of the heat source is lower than the first value T1, and it means that the heat source does not need to be cooled.

After the inlet valve 12 is closed, the temperature T of the heat source may decrease from the first value T1 for a period and then rise again to a second value T2 because the heat source continuously generates heat during operation. As steps S5 and S6 indicate in FIG. 3, when the temperature T of the heat source equals or exceeds the second value T2 (i.e. T≥T2), the exhaust valve 14 can be opened (step S6) to vaporize and discharge the liquefied gas from the chamber 13 to the atmospheric environment. Additionally, if the pressure sensor detects that the pressure P inside the chamber 13 equals or exceeds a critical value P1 (step S5), i.e. P≥P1, the exhaust valve 14 can also be opened (step S6) to vent the liquefied gas via the exhaust valve 14 to the atmospheric environment. In this embodiment, the first and second valves T1 and T2 are within a range of 50° C. to 70° C.

Since the liquefied gas in the chamber 13 can absorb considerable latent heat of vaporization from the heat source when the exhaust valve 14 is opened, the heat source in the electronic device C can be further cooled down as a second stage of cooling. However, if the temperature T of the heat source is lower than the second value T2 (i.e. T<T2) and the pressure P inside the chamber 13 is lower than the critical value P1 (i.e. P<P1), the exhaust valve 14 may remain closed to prevent the liquefied gas from leaking out of the chamber 13.

Still referring to FIG. 3, when the exhaust valve 14 is opened (step S6), the liquefied gas in the chamber 13 can be discharged to the atmospheric environment until the pressure P inside the chamber 13 equals the pressure PA of the atmospheric environment (step S711). After step S711, the exhaust valve 14 is closed (step S712) since the liquefied gas has been discharged to the atmospheric environment. Subsequently, the temperature sensor may detect the temperature T of the heat source again, and if the temperature T rises to the first value T1, i.e. T≥T1 (step S1), the inlet valve 12 is opened (step S2), so that the liquefied gas in the liquefied gas source is allowed to refill into the chamber 13.

In another aspect, as steps S721 and S722 indicate in FIG. 3, after the exhaust valve 14 is opened (step S6), if the temperature T of the heat source decreases from the second value T2 to below a third value TS or the pressure P inside the chamber decreases from the critical value P1 to below a safety value PS, i.e. T<TS or P<PS (step S722), the exhaust valve 14 can be immediately closed since the liquefied gas in the chamber 13 does not need to be completely discharged. That is, when the temperature T and the pressure P decrease to a safe range, the exhaust valve 14 can keep closed to conserve the remaining liquefied gas in the chamber 13. However, if the temperature T of the heat source reaches the second value T2 again or the pressure P inside the chamber 13 reaches the critical value P1, i.e. T≤T2 or P≥P1 (step S5), the exhaust valve 14 may be opened again (step S6) to discharge the liquefied gas from the chamber 13 to the atmospheric environment in an intermittent manner.

In summary, the invention provides a special method for cooling a heat source by filling liquefied gas into a chamber which is located in an electronic device, and it is very different from the conventional cooling means that transfers heat via heat pipes to thermal fins. According to an embodiment of the invention, the inlet and exhaust valves may be electronic control valves which can be automatically switched on or off by a circuit control unit, so that the heat source in the electronic device can be efficiently cooled down. Specifically, when the exhaust valve is opened, the liquefied gas in the chamber can be vaporized by absorbing the latent heat of vaporization from the heat source, thereby achieving efficient and rapid heat dissipation of the electronic device.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A method for cooling a heat source, wherein the heat source is cooled by filling a liquefied gas into a chamber close to the heat source, and the heat source is located in an electronic device, the method comprising:
    detecting the temperature of the heat source and filling the liquefied gas into the chamber via an inlet valve to absorb heat generated by the heat source when the temperature of the heat source rises to a first value, wherein when the temperature of the heat source reaches the first value, the liquefied gas is filled into the chamber from a liquefied gas source until the pressure inside the chamber equals the pressure inside the liquefied gas source;
    opening an exhaust valve that communicates with the chamber when the temperature of the heat source decreases and then rises to a second value or the pressure inside the chamber reaches a critical value, to vaporize and discharge the liquefied gas in the chamber through the exhaust valve to an atmospheric environment; and
    during vaporization and discharge of the liquefied gas in the chamber through the exhaust valve to the atmospheric environment, closing the exhaust valve when the temperature of the heat source decreases from the second value to a third value.

2. The method as claimed in claim 1, wherein the liquefied gas source comprises a liquefied gas tank or a replaceable liquefied gas bottle.

3. The method as claimed in claim 1, wherein the heat source comprises an electronic element, and the liquefied gas source is disposed outside the electronic device.

4. The method as claimed in claim 1, wherein when the temperature of the heat source decreases and then rises to the second value or the pressure inside the chamber reaches the critical value, opening the exhaust valve until the pressure inside the chamber equals the pressure of the atmospheric environment.

5. The method as claimed in claim 4, further comprising: during vaporization and discharge of the liquefied gas in the chamber through the exhaust valve to the atmospheric environment, closing the exhaust valve when the pressure inside the chamber decreases from the critical value to below a safety value.

6. The method as claimed in claim 1, further comprising: opening a safety valve to reduce the pressure inside the chamber when the pressure inside the chamber is greater than a limit value, wherein the safety valve is connected to the chamber.

7. The method as claimed in claim 1, wherein the liquefied gas comprises carbon dioxide ($CO_2$).

8. The method as claimed in claim 1, wherein the first and second values are within a range of 50° C. to 70° C.

9. A method for cooling a heat source, wherein the heat source is cooled by filling a liquefied gas into a chamber close to the heat source, and the heat source is located in an electronic device, the method comprising:
   detecting the temperature of the heat source and filling the liquefied gas into the chamber via an inlet valve to absorb heat generated by the heat source when the temperature of the heat source rises to a first value; and
   opening an exhaust valve that communicates with the chamber when the temperature of the heat source decreases and then rises to a second value or the pressure inside the chamber reaches a critical value, to vaporize and discharge the liquefied gas in the chamber through the exhaust valve to an atmospheric environment; and
   during vaporization and discharge of the liquefied gas in the chamber through the exhaust valve to the atmospheric environment, closing the exhaust valve when the temperature of the heat source decreases from the second value to a third value.

10. The method as claimed in claim 9, wherein when the temperature of the heat source reaches the first value, the liquefied gas is filled into the chamber from a liquefied gas source.

11. The method as claimed in claim 10, wherein the liquefied gas source comprises a liquefied gas tank or a replaceable liquefied gas bottle.

12. The method as claimed in claim 10, wherein the heat source comprises an electronic element, and the liquefied gas source is disposed outside the electronic device.

13. The method as claimed in claim 9, wherein when the temperature of the heat source decreases and then rises to the second value or the pressure inside the chamber reaches the critical value, opening the exhaust valve until the pressure inside the chamber equals the pressure of the atmospheric environment.

14. The method as claimed in claim 13, further comprising:
   during vaporization and discharge of the liquefied gas in the chamber through the exhaust valve to the atmospheric environment, closing the exhaust valve when the pressure inside the chamber decreases from the critical value to below a safety value.

15. The method as claimed in claim 9, further comprising:
   opening a safety valve to reduce the pressure inside the chamber when the pressure inside the chamber is greater than a limit value, wherein the safety valve is connected to the chamber.

16. The method as claimed in claim 9, wherein the liquefied gas comprises carbon dioxide ($CO_2$).

17. The method as claimed in claim 9, wherein the first and second values are within a range of 50° C. to 70° C.

* * * * *